United States Patent [19]
Sakurai et al.

[11] Patent Number: 5,486,993
[45] Date of Patent: Jan. 23, 1996

[54] CONTROLLING APPARATUS FOR HIGH FREQUENCY HIGH VOLTAGE POWER SOURCE FOR CORONA DISCHARGE PROCESSING

[75] Inventors: Yukihira Sakurai; Takehiko Ueda, both of Tokyo, Japan

[73] Assignee: Kasuga Denki, Incorporated, Tokyo, Japan

[21] Appl. No.: 140,549

[22] Filed: Oct. 25, 1993

[30] Foreign Application Priority Data

Oct. 26, 1992 [JP] Japan .................................. 4-309823

[51] Int. Cl.⁶ .................................................. H02M 5/44
[52] U.S. Cl. .............................................. 363/98; 363/137
[58] Field of Search .................................... 363/132, 131, 363/98, 97

[56] References Cited

U.S. PATENT DOCUMENTS

| | | | |
|---|---|---|---|
| 5,062,031 | 10/1991 | Flachenecker et al. | 363/16 |
| 5,099,410 | 3/1992 | Divan | 363/98 |
| 5,245,520 | 9/1993 | Imbertson | 363/17 |
| 5,267,138 | 11/1993 | Shores | 363/98 |

FOREIGN PATENT DOCUMENTS 1218356  8/1989  Japan .......................... H02M 3/28

Primary Examiner—Peter S. Wong
Assistant Examiner—Robert Nappi
Attorney, Agent, or Firm—Sughrue, Mion, Zinn, Macpeak & Seas

[57] ABSTRACT

A controlling apparatus for a high frequency high voltage power source is disclosed which eliminates a switching loss of a high frequency invertor and allows adjustment of the output power to be performed continuously and accurately over a wide range. A resonance current of a resonance circuit of the high frequency high voltage power source is detected by current detection means, and a phase locked loop circuit locks itself with a frequency with which it coincides in phase with the resonance current to produce a synchronized pulse signal. From the pulse signal, a signal having a zero voltage outputting period of a preset duration is formed by a pulse density modulation circuit to change the pattern of a gate signal for switching semiconductor elements of a high frequency invertor to adjust the output power. An input voltage before a zero voltage outputting period is entered is stored into voltage storage means such as a sample and hold circuit so that the phase locked loop circuit may continue to lock with the same frequency also during the zero voltage outputting period.

4 Claims, 12 Drawing Sheets

50 μsec/div

20 μsec/div

50 μsec/div

20 μsec/div

10 KV/div    1 A/div

10 KV/div    1 A/div

50 μsec/div

50 μsec/div 5,486,993

CONTROLLING APPARATUS FOR HIGH FREQUENCY HIGH VOLTAGE POWER SOURCE FOR CORONA DISCHARGE PROCESSING

BACKGROUND OF THE INVENTION

1. Field of the Invention

This invention relates to a controlling apparatus for controlling the power to be supplied to a load from a high frequency high voltage power source used suitably for a corona discharge processing apparatus or a like apparatus.

2. Description of the Related Art

The applicant of the present invention has proposed, in Japanese Patent Laid-Open Application No. Heisei 1-218356, a method of adjusting the high frequency output power of a high voltage transformer of a high frequency high voltage power source, wherein the power from a commercial ac power supply is rectified by a rectifier circuit and the dc power obtained from the rectifier circuit is switched by means of an invertor and boosted by the high voltage transformer, by varying the switching excitation frequency supplied to a switching semiconductor element connected between the dc power source and the high voltage transformer.

When a high voltage from the high frequency high voltage power source is applied to a discharge electrode to perform surface treatment of a plastic film or a like material by corona discharge from the discharge electrode, the high voltage transformer, the discharge electrode and the high voltage wiring line cooperatively form a dc resonance circuit and make a resonance load as viewed from the invertor of the high frequency high voltage power source. Therefore, where a popular semiconductor element is employed as the switching semiconductor element between the dc power source and the high voltage transformer, if it does not perform its switching operation at or around the zero resonance current while it is always held in synchronism with the resonance current, then heat generation or a breakdown of the element is caused by the switching loss of the semiconductor element. However, the method described above only discloses a general method of merely varying the switching excitation frequency, but does not pay particular attention to the problem. Further, the method does not provide any particular adjustment of the output voltage and cannot realize continuous adjustment over a wide range.

SUMMARY OF THE INVENTION

It is an object of the present invention to provide a controlling apparatus for a high frequency high voltage power source by which a switching operation of a switching element at or around the zero resonance current while held in synchronism with the resonance current can be realized with certainty to eliminate an otherwise possible loss involved in the switching operation.

It is another object of the present invention to provide a controlling apparatus for a high frequency high voltage power source by which a switching element continuously operates in synchronism with the resonance current and the output power can be adjusted continuously and readily over a wide range from the 100% at the maximum output power to 1% or less.

It is a further object of the present invention to provide a controlling apparatus for a high frequency high voltage power source by which, where the high frequency high voltage power source is used for corona discharge processing, the corona discharge processing can proceed accurately over a wide range from weak processing to strong processing.

In order to attain the objects described above, the present invention adopts, as a method of controlling switching semiconductor elements of a high frequency invertor on and off, a pulse density modulation controlling method by which the density of a pulse signal used for a gate signal to the switching semiconductor elements, that is, the ratio in duration between the high level and the low level, can be varied arbitrarily. In particular, according to the present invention, there is provided a controlling apparatus for a high frequency high voltage power source of the type wherein an ac voltage from a commercial ac power supply is rectified into a dc voltage by a rectifier circuit and then converted into a voltage of a high frequency by a high frequency invertor including a plurality of switching semiconductor elements connected in a bridge connection, and the voltage of the high frequency is boosted by a high voltage transformer, the high voltage transformer and at least a load connected to the high voltage transformer forming a resonance circuit, the controlling apparatus comprising a pulse density modulation circuit responsive to a pulse density modulation instruction value for outputting a pulse signal of a pulse density to be used as a trigger signal to switch the switching semiconductor elements of the high frequency invertor on and off.

With the controlling apparatus for a high frequency high voltage power source, the pulse density modulation circuit outputs a pulse signal of a pulse density in accordance with a pulse density modulation instruction. Consequently, the pulse density can be varied continuously and finely by continuously varying the pulse density modulation instruction value. Then, the switching semiconductor elements of the high frequency invertor are controlled on and off by the pulse density modulation signal from the pulse density modulation circuit. Consequently, a switching operation of the switching semiconductor elements at or around the zero resonance current synchronized with the resonance current can be realized with certainty, and accordingly, the switching loss is reduced and the output power of the high frequency high voltage power source can be adjusted continuously and arbitrarily over a wide range from 100% at the maximum output power to 1% or less. Accordingly, where the high frequency high voltage power source is used for corona discharge processing, the processing can be adjusted accurately over a wide range from weak processing to strong processing.

Preferably, each of the switching semiconductor elements is a bipolar transistor of the insulated gate type. The employment of a bipolar transistor of the insulated gate type assures a high speed operation of the high frequency invertor, and consequently, stabilized high frequency output power can be obtained from the high frequency high voltage power source.

Preferably, the controlling apparatus for a high frequency high voltage power source further comprises current detection means for detecting a current flowing between the high frequency invertor and the high voltage transformer, and a phase locked loop circuit including a phase comparator and a voltage controlled oscillator for outputting a signal having a phase corresponding to the detection current of tile current detection means and a frequency corresponding to the input voltage to the voltage controlled oscillator, the pulse density modulation circuit inputting and thinning out an output signal of the phase locked loop circuit to produce and output a pulse signal which is synchronized with the output signal of the phase locked loop circuit and has a zero voltage outputting period of a duration determined from the pulse density modulation instruction value. The resonance current of the resonance circuit is detected by the current detection means, and the phase locked loop circuit locks itself with a frequency with which the output thereof coincides in phase with the resonance circuit so that the pulse signal of the pulse density modulation circuit is synchronized with the resonance current. Then, the switching semiconductor elements are controlled on and off by the pulse signal synchronized with the resonance current and having the zero voltage outputting period of the duration determined from the pulse density modulation instruction value. Consequently, the synchronism in phase with the resonance current can be established with certainty.

In this instance, preferably the controlling apparatus for a high frequency high voltage power source further comprises a gate signal generation circuit for inputting the pulse signal from the pulse density modulation circuit and outputting a gate signal to the switching semiconductor elements of the high frequency invertor so that the resonance circuit may be put into and remain in a short-circuited condition within the zero voltage outputting period. Thus, within the zero voltage outputting period of the pulse signal of the pulse density modulation circuit, tile resonance circuit remains in a short-circuited condition in response to the gate signal generated from the gate signal generation circuit. Consequently, the resonance current of the resonance circuit can be detected also during the zero voltage outputting period.

Or preferably, the controlling apparatus for a high frequency high voltage power source further comprises voltage storage means for storing an input voltage to the voltage controlled oscillator before the zero voltage outputting period is entered and inputting the thus stored voltage to the voltage controlled oscillator also during the zero voltage outputting period. The input voltage to tile voltage controlled oscillator of the phase locked loop circuit is stored into the voltage storage means before the zero voltage outputting period of the pulse density modulation circuit is entered, and the voltage controlled oscillator continues to oscillate with the thus stored voltage. Consequently, the voltage controlled oscillator continuously oscillates a signal of the same frequency. Accordingly, the phase locked loop operates continuously and can continue, also during the zero voltage outputting period, its stabilized operation synchronized accurately with the resonance circuit.

The voltage storage means may be a sample and hold circuit. The employment of a ready-made sample and hold circuit allows the voltage storage means to be constructed readily at a low cost.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
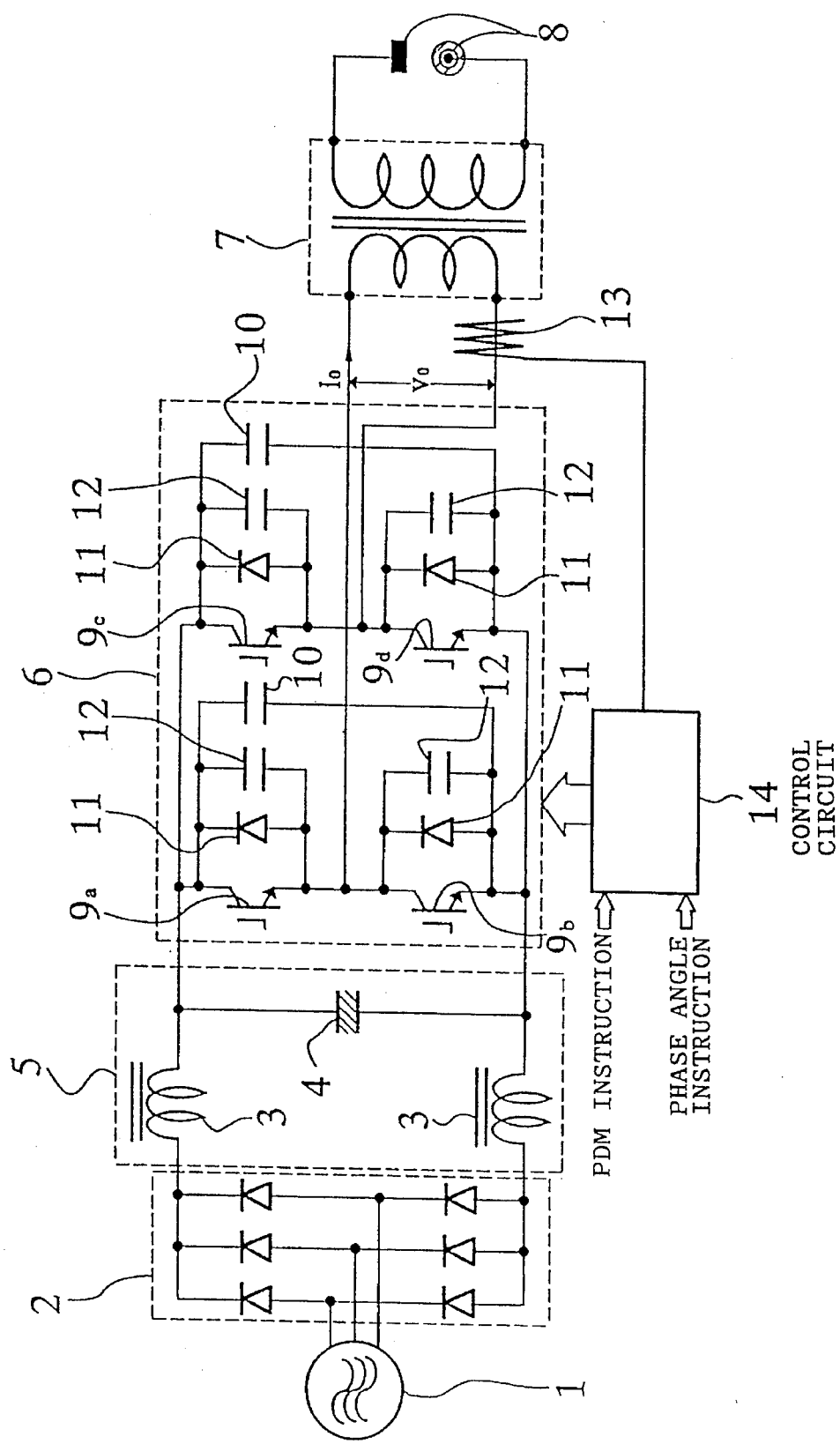
FIG. 1 is an electric circuit diagram of a high frequency high voltage power source.

Referring first to FIG. 1, there is shown an example of a high frequency high voltage power source for which a controlling apparatus according to the present invention can be used. The high frequency high voltage power source includes a diode bridge rectifier circuit 2 for rectifying an ac voltage from a commercial ac power supply 1 of, for example, 200-V three-phase, a smoothing circuit 5 formed from a dc reactor 3 and a capacitor 4, a high frequency invertor 6 for converting a dc current obtained by rectification into a high frequency current, and a high voltage transformer 7 for boosting the high frequency voltage and supplying the thus boosted high frequency high voltage to a discharge electrode 8. As viewed from the high frequency invertor 6, the elements between the high voltage transformer 7 and the discharge electrode 8 both inclusive constitute an RCL series resonance circuit which includes the leakage inductance and the stray capacitance of the high voltage transformer 7 and the capacitance and the wiring resistance of the discharge electrode 8, and thus eliminates the necessity for an externally connected reactor and capacitor.

The high frequency invertor 6 shown has a full bridge configuration which includes, using two insulated gate bipolar transistor modules of the two-in-one type, four insulated gate bipolar transistors (IGBTs) 9a, 9b, 9c and 9d and two coupling capacitors 10. Connected in parallel to each of the insulated gate bipolar transistors 9a to 9d are a circulating current diode 11 for preventing a switching loss upon turning on of the associated insulated gate bipolar transistor and a snubber capacitor 12 for restricting a rise of the voltage between the collector and the emitter of the associated insulated gate bipolar transistor upon turning off and bypassing the collector current to reduce tile switching loss. As seen from the waveform curves (1) and (2) of FIG. 3, the high frequency invertor 6 is controlled in such a manner as hereinafter described so that an output current $I_0$ thereof may always have a phase delayed by a phase angle β with respect to an output voltage $V_0$ thereof.

In the high frequency high voltage power source described above, a resonance current flowing between the high frequency invertor 6 and the high voltage transformer 7 is detected by a current detector 13, and tile current is inputted to a control circuit 14. The control circuit 14 thus outputs a gate signal synchronized with the resonance current to control turning on and off of the insulated gate bipolar transistors 9a, 9b, 9c and 9d. The density of pulses which make the gate signal is modulated arbitrarily to effect power control of the high frequency high voltage power source, and a detailed construction of the control circuit 14 is shown in FIG. 2.

Figure 2:
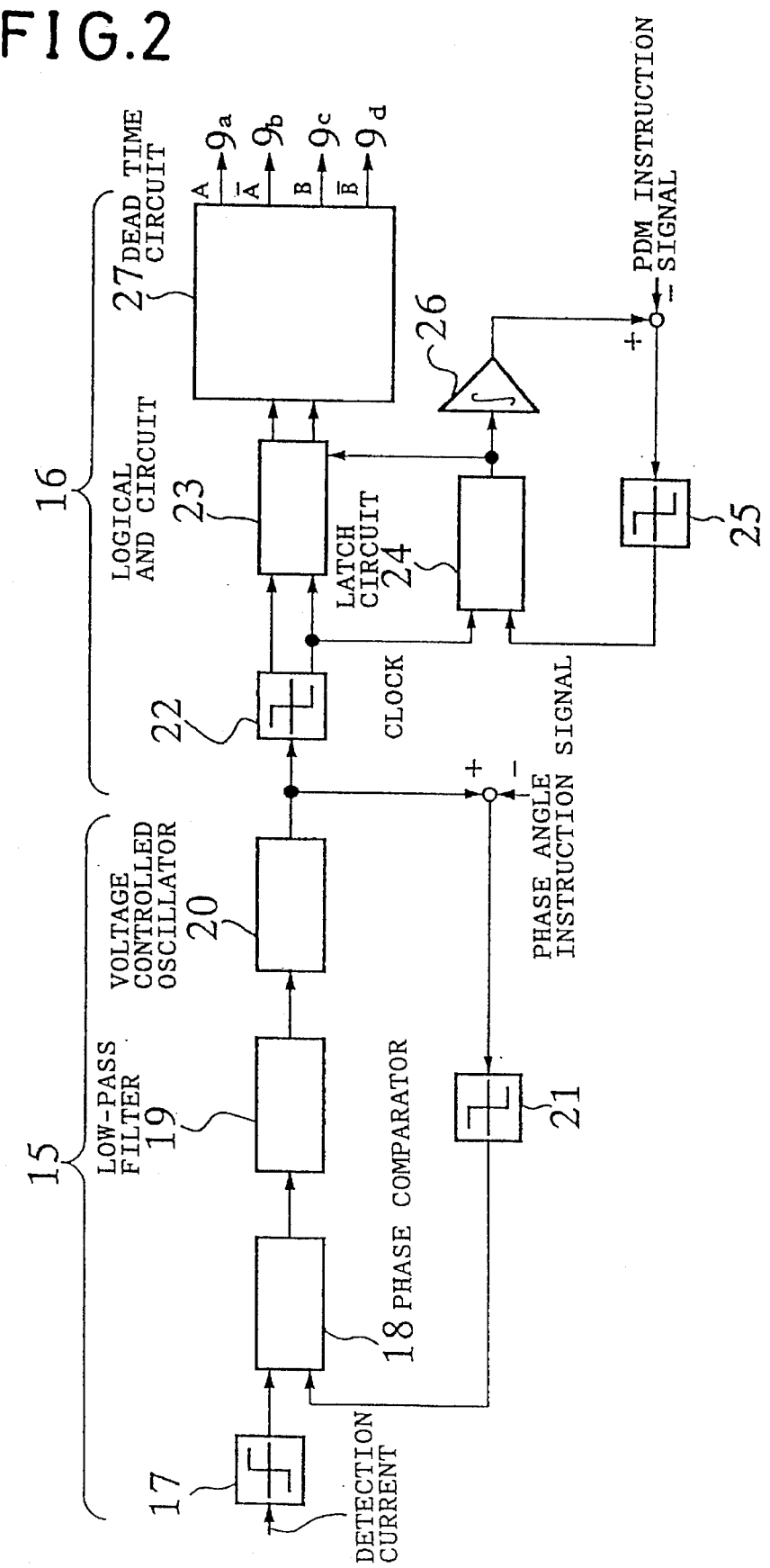
FIG. 2 is a block diagram of a controlling apparatus for controlling the high frequency high voltage power source of FIG. 1 showing a preferred embodiment of the present invention.

Referring now to FIG. 2, the control circuit 14 is roughly constituted from a phase locked loop (PLL) circuit 15 and a pulse density modulation (PDM) circuit 16. The phase locked loop circuit 15 has a basic closed loop circuit configuration including a phase comparator 18, a low-pass filter 19, a voltage controlled oscillator 20 and a comparator 21 and additionally includes a zero-cross comparator 17 provided on the input side of the phase comparator 18. The zero-cross comparator 17 converts a resonance current detected by the current detector 13 into a current of such a rectangular waveform as seen from the waveform curve (3) of FIG. 3. The output of the zero-cross comparator 17 is compared in phase at a rising edge thereof with the output of tile comparator 21 shown by the waveform curve (4) of FIG. 3 by the phase comparator 18. The output of the phase comparator 18 is converted into a signal of a rectangular waveform by the low-pass filter 19 and inputted to the voltage controlled oscillator 20.

The voltage controlled oscillator 20 generates a signal of a frequency corresponding to a voltage inputted thereto. In particular, the voltage controlled oscillator 20 generates such a chopping wave signal corresponding to the input voltage as shown by the waveform curve (5) of FIG. 3. The voltage controlled signal is compared with a phase angle instruction signal from an operation section not shown by the comparator 21, and a pulse displaced by a phase angle β based on the phase angle instruction signal is outputted as seen from the waveform curve (4) of FIG. 3 from the comparator 21. The pulse is compared in phase with the output of the zero-cross comparator 17 shown by the waveform curve (3) of FIG. 3 by the phase comparator 18 as described above. Accordingly, the phase locked loop circuit 15 locks itself with a frequency with which the phases of the output of the comparator 17 and the output of the comparator 21 coincide with each other and which corresponds to the input voltage to the voltage controlled oscillator 20.

The pulse density modulation circuit 16 includes a comparator 22, a logical AND circuit 23, a latch circuit 24, a comparator 25, an integrator 26 and a dead time circuit 27. The comparator 22 converts a chopping wave signal from the voltage controlled oscillator 20 into two series of pulses of mutually inverted phases as seen from the waveform curves (6) and (7) of FIG. 3. In this instance, the pulses have a phase advanced by β from that of the output of the comparator 21, that is, the resonance current $I_0$, due to such operation of the phase locked loop circuit 15 as described above.

Figure 3:
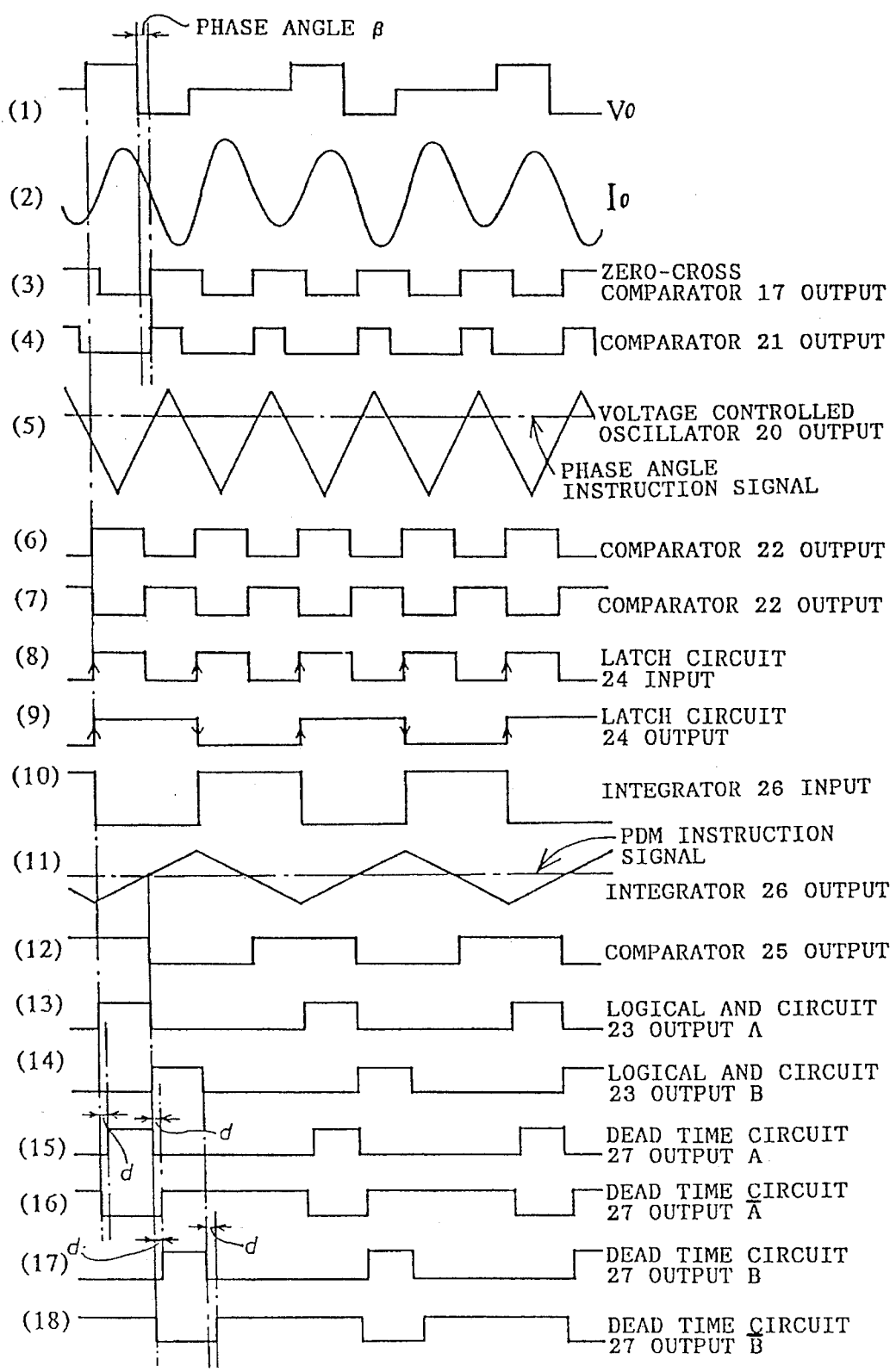
FIG. 3 is a time chart illustrating operation of the controlling apparatus shown in FIG. 2.

One of the two series of pulses from the comparator 22 is inputted as a reference signal (clock pulse signal) to the latch circuit 24 as seen from the waveform curve (8) of FIG. 3. The output of the latch circuit 24 shown by the waveform curve (9) of FIG. 3 is inputted to and integrated by the integrator 26 as shown by the waveform curve (10) of FIG. 3 so that a signal of such a waveform as shown by the waveform curve (11) of FIG. 3 is obtained from the integrator 26. The integration output of the integrator 26 is compared with a pulse density modulation instruction signal from the operation section by the comparator 25, and pulses wherein the ratio between durations of the high level and the low level is varied as shown by the waveform curve (12) of FIG. 3 is outputted from the comparator 25. The thus modulated (pulse density modulated) pulses are inputted back to the latch circuit 24, thereby forming a pulse density modulation loop. Then, the loop output is logically ANDed with the two series of output pulses (reference signals) of the comparator 22 by the logical AND circuit 23 to produce zero voltage outputting periods while synchronized with the resonance current. In this instance, the two series A and B of outputs of the logical AND circuit 23 exhibit such a condition that, as seen from the waveform curves (13) and (14) of FIG. 3, after the series A exhibits the high level, the series B exhibits the high level continuously to the high level of the series A, and this is repeated at a time interval set by the pulse density modulation instruction. In other words, the high level portions of the two series of output pulses of the comparator 22 are thinned out while the output of the latch circuit 24 exhibits the low level, and the number of pulses to be thinned out can be adjusted arbitrarily by the pulse density modulation instruction.

The two series A and B of outputs of the logical AND circuit 23 are inputted to the dead time circuit 27 which serves also as a gate signal generation circuit for turning the insulated gate bipolar transistors 9a, 9b, 9c and 9d on and off so that they are outputted as four series of gate signals, which are delayed by a fixed dead time d as seen from the waveform curves (15), (16), (17) and (18) of FIG. 3, from the dead time circuit 27. Then, the output of the waveform curve (15) of FIG. 3 is inputted to the insulated gate bipolar transistor 9a in FIG. 1; the output of the waveform curve (16) is inputted to the insulated gate bipolar transistor 9b; the output of the waveform curve (17) is inputted to the insulated gate bipolar transistor 9c; and the output of the waveform curve (18) is inputted to the insulated gate bipolar transistor 9d, each as a gate signal. In particular, a pulse same as a gate pulse for the insulated gate bipolar transistor 9a is inputted as a gate pulse to the insulated gate bipolar transistor 9d while a pulse same as a gate pulse for the insulated gate bipolar transistor 9c is inputted as a gate pulse to the insulated gate bipolar transistor 9b so that the insulated gate bipolar transistors 9c and 9b may be turned on without fall after the insulated gate bipolar transistors 9a and 9d are turned on. During a zero voltage outputting period, all of the insulated gate bipolar transistors 9a, 9b, 9c and 9d are turned off without fall.

Where the control circuit is constructed in such a manner as described above, since the current detector 13 can detect a current also during the zero voltage outputting period, the phase locked loop circuit maintains its continuous operation, and consequently, such a synchronized operation as described above can be continued. Further, since the pulse density modulation instruction value to the pulse density modulation circuit 18 can be varied continuously, also the pulse density can be varied continuously and the zero voltage outputting period can be adjusted arbitrarily. Since the discharge power varies directly as square to the voltage, a high frequency high voltage power source which does not have a condition wherein pulse density modulation is zero, that is, a zero voltage outputting period, does not allow fine adjustment of power of a low level, but with a high frequency high voltage power source provided with the present controlling apparatus, the discharge power can be adjusted continuously and arbitrarily from 100% to 1% or less.

An experimental model was manufactured in accordance with the construction described above, and an experiment was conducted with the experimental model. The maximum ratings of the insulated gate bipolar transistor modules used were 500 V for the collector-emitter voltage and 50 A for the collector current, and the steady frequency of the high frequency invertor 6 then was 30 KHz and the power consumption was 5 KW. Further, the dead time d of tile dead time circuit 27 was 1.5 µsec, and the turn ratio of the high voltage transformer 7 was 30:600. Results of the experiment are shown in FIGS. 4 to 10.

Figure 4:
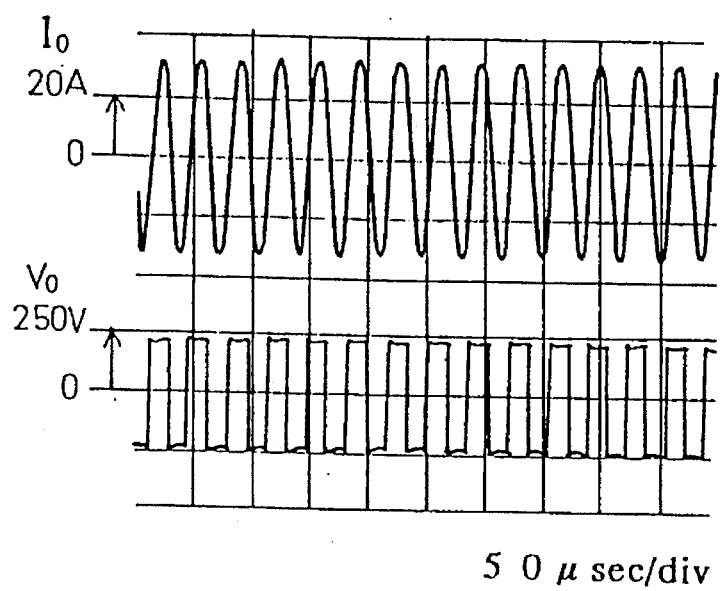
FIG. 4 is a waveform diagram illustrating an output current and an output voltage at the maximum output power according to results of an experiment conducted with an experimental model of the controlling apparatus of FIG. 2.
Figure 5:
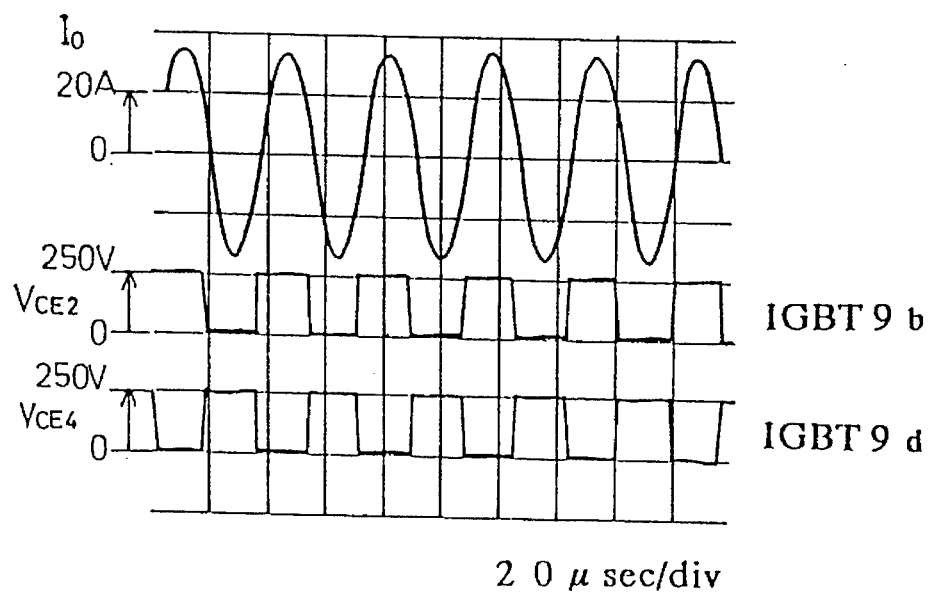
FIG. 5 is a waveform diagram illustrating an output current of the experimental model and a collector-emitter voltage of an insulated gate bipolar transistor of FIG. 2.
Figure 6:
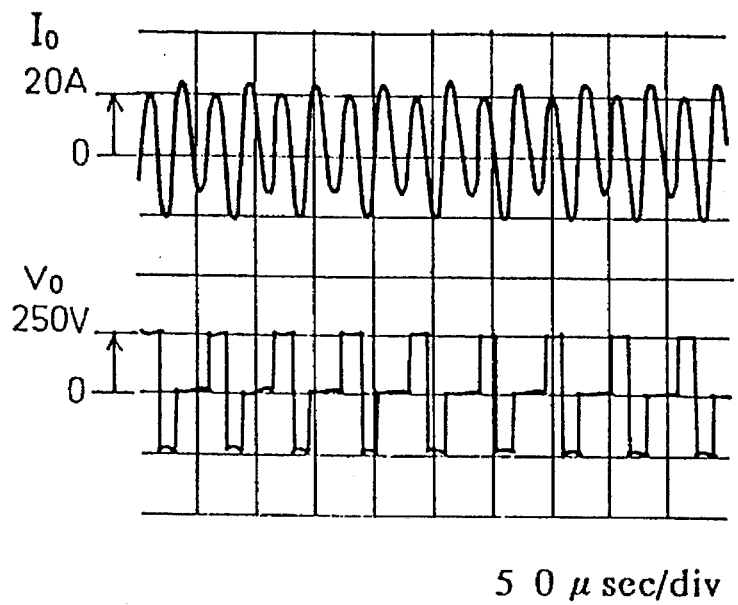
FIG. 6 is a waveform diagram illustrating the output current and the output voltage at the output power of 33%.
Figure 7:
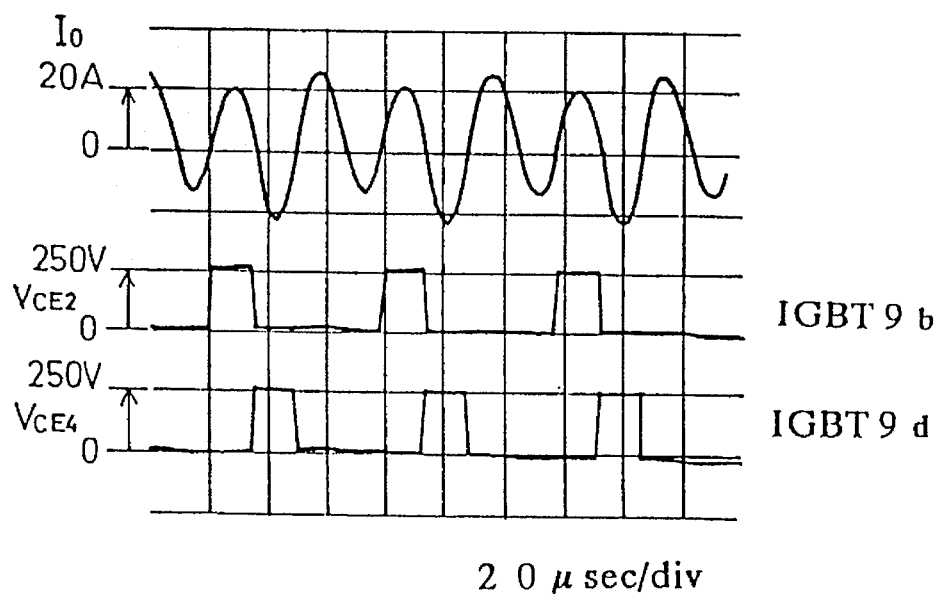
FIG. 7 is a waveform diagram illustrating the output current and the collector-emitter voltage of the insulated gate bipolar transistor at the output power of 33%.
Figure 8:
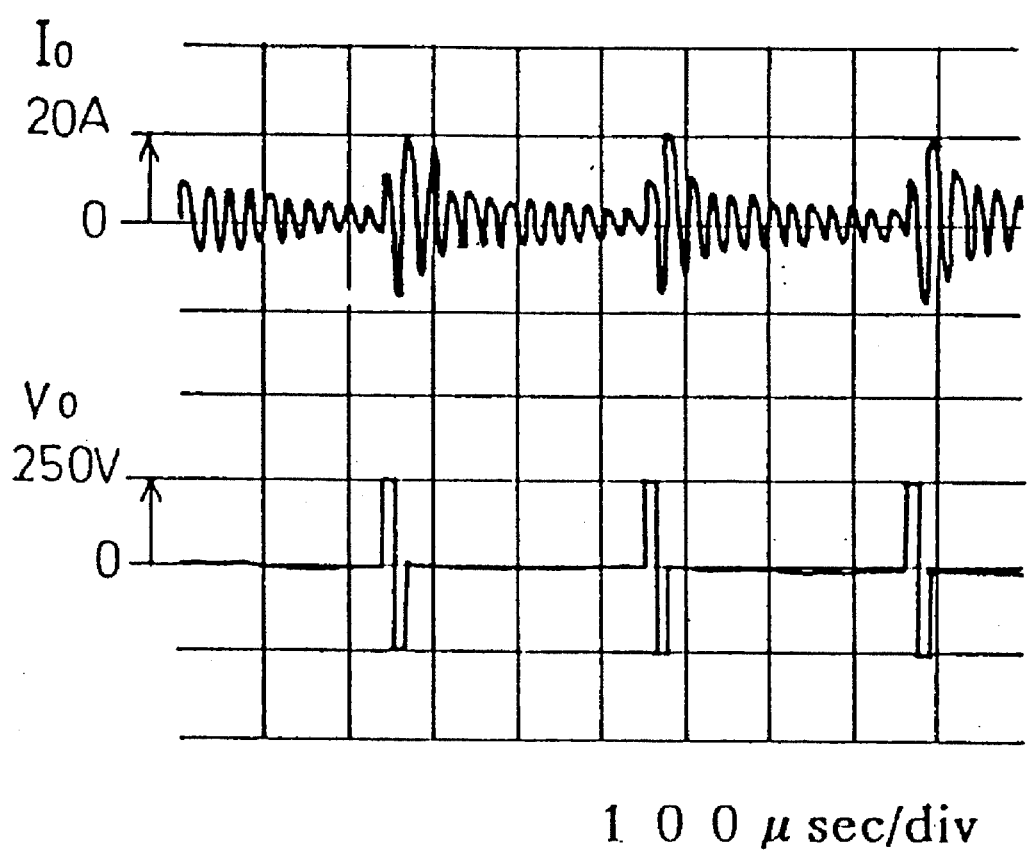
FIG. 8 is a waveform diagram illustrating the output current and the output voltage at the output power of 3.4%.
Figure 9:
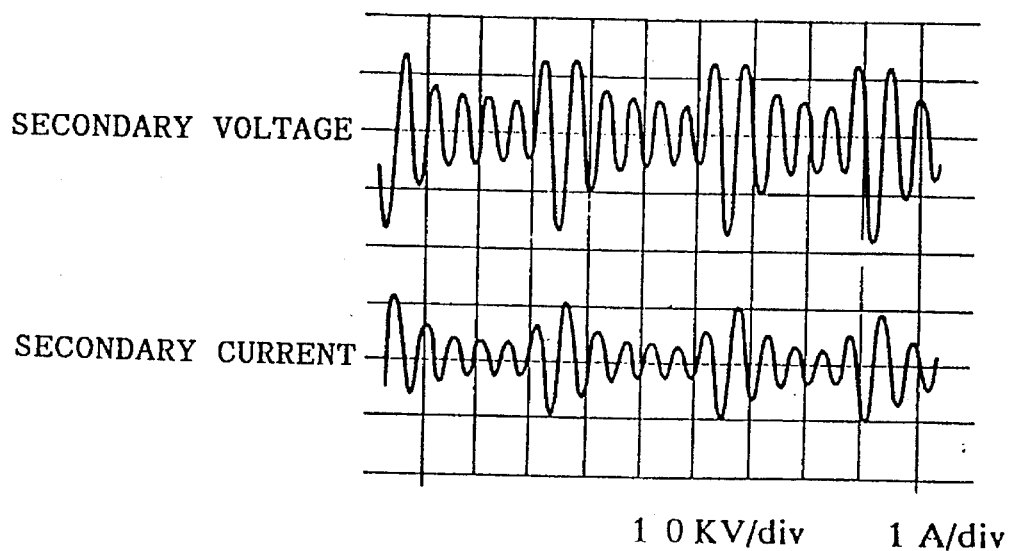
FIG. 9 is a waveform diagram illustrating a secondary voltage and a secondary current of a high voltage transformer of the controlling apparatus of FIG. 2 at the output power of 16.66%.
Figure 10:
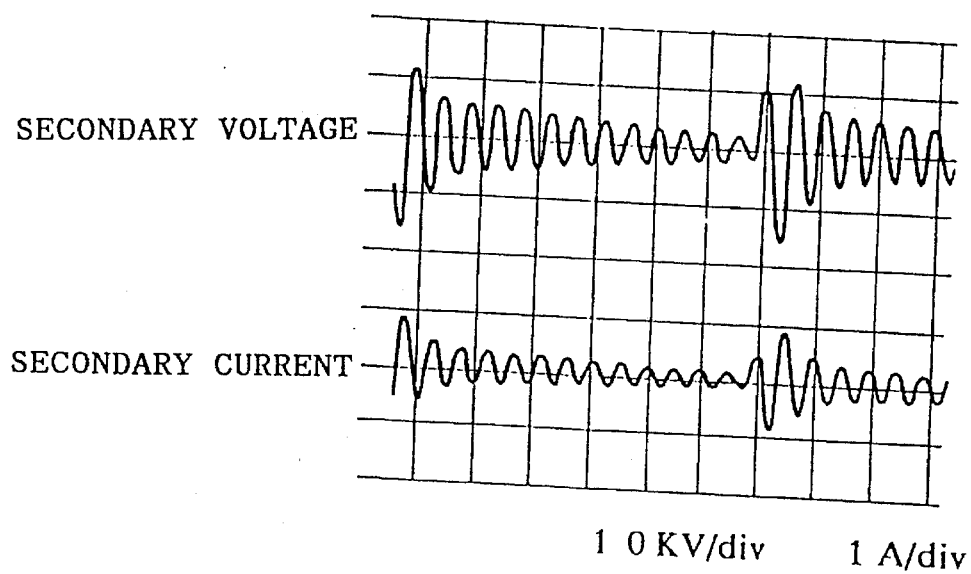
FIG. 10 is a waveform diagram illustrating the secondary voltage and the secondary current of the high voltage transformer at the output power of 7.1%.

FIG. 4 shows the waveforms of the output current $I_0$ and the output voltage $V_0$ of the high frequency invertor 6 at the maximum output power, and FIG. 5 shows the waveforms of the output current $I_0$ and the collector-emitter voltage vce of the insulated gate bipolar transistors 9b and 9d with the output power consumption of about 5.6 KW. FIG. 6 shows the waveforms of the output current $I_0$ and the output voltage $V_0$ at the output power of 33%, and FIG. 7 shows the waveforms of the output current $I_0$ and the collector-emitter voltage vce of the insulated gate bipolar transistors 9b and 9d then. In this instance, in the output voltage, one pulse was outputted for two periods of the resonance current, and the output voltage was about one half that at the maximum output power and the output power consumption was about 1.9 W. FIG. 8 shows the waveforms of the output current $I_0$ and the output voltage $V_0$ at the output power of 3.4%. In this instance, the output voltage was about one thirteenth that at the maximum output power, and the output power consumption was about 0.2 KW. FIG. 9 shows the waveforms of the secondary voltage and the secondary current of the high voltage transformer 7 at the output power of 16.66%, and FIG. 10 similarly shows the waveforms of the secondary voltage and the secondary current at the output power of 7.1%.

Figure 11:
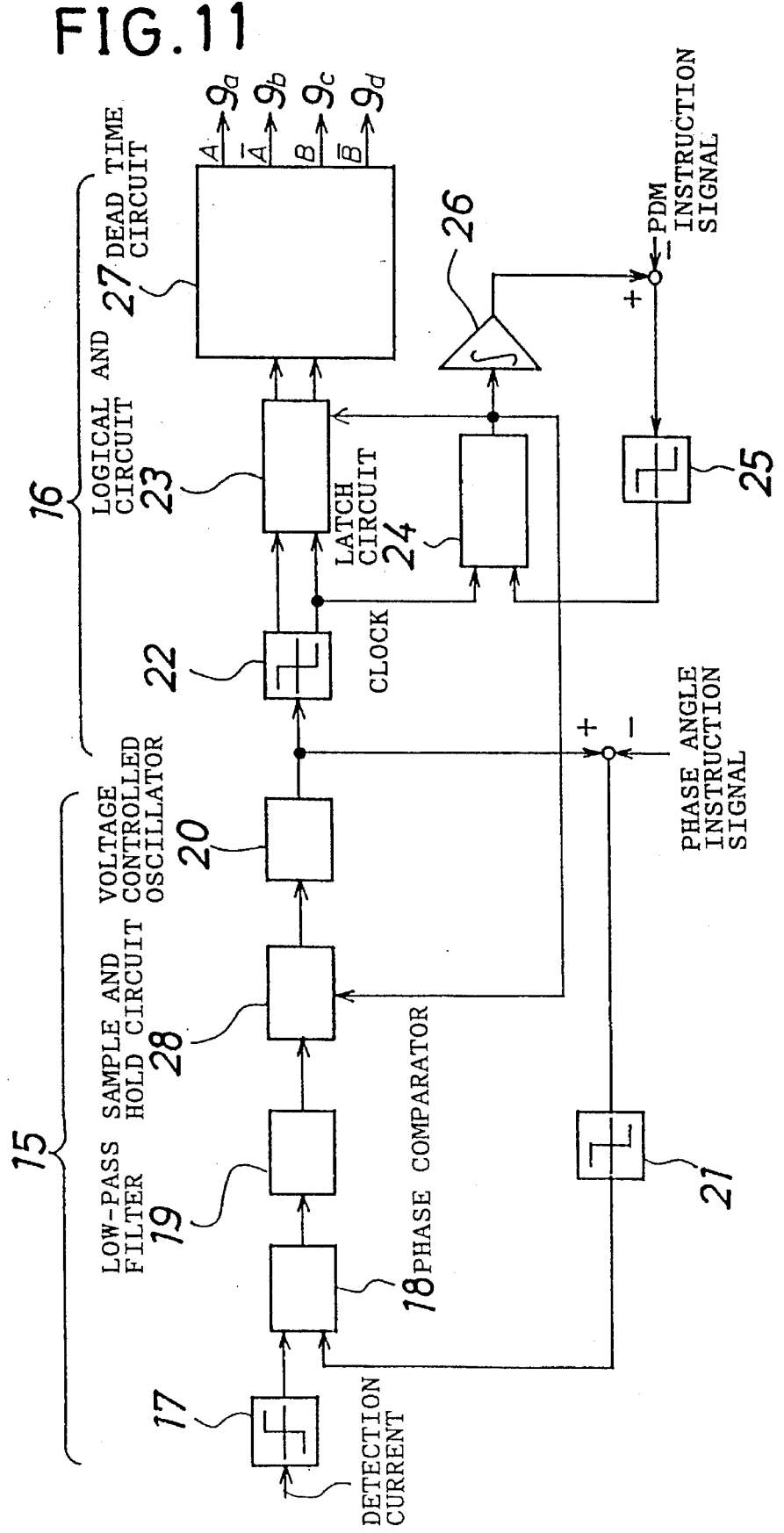
FIG. 11 is a block diagram of another controlling apparatus showing another embodiment of the present invention.

Referring now to FIG. 11, there is shown a control circuit according to a second preferred embodiment of the present invention. The control circuit is a modification to and has several common components to those of the control circuit described hereinabove with reference to FIG. 2. Thus, like components to those of FIG. 2 are denoted by like reference numerals and overlapping description thereof is omitted herein to avoid redundancy.

Figure 12:
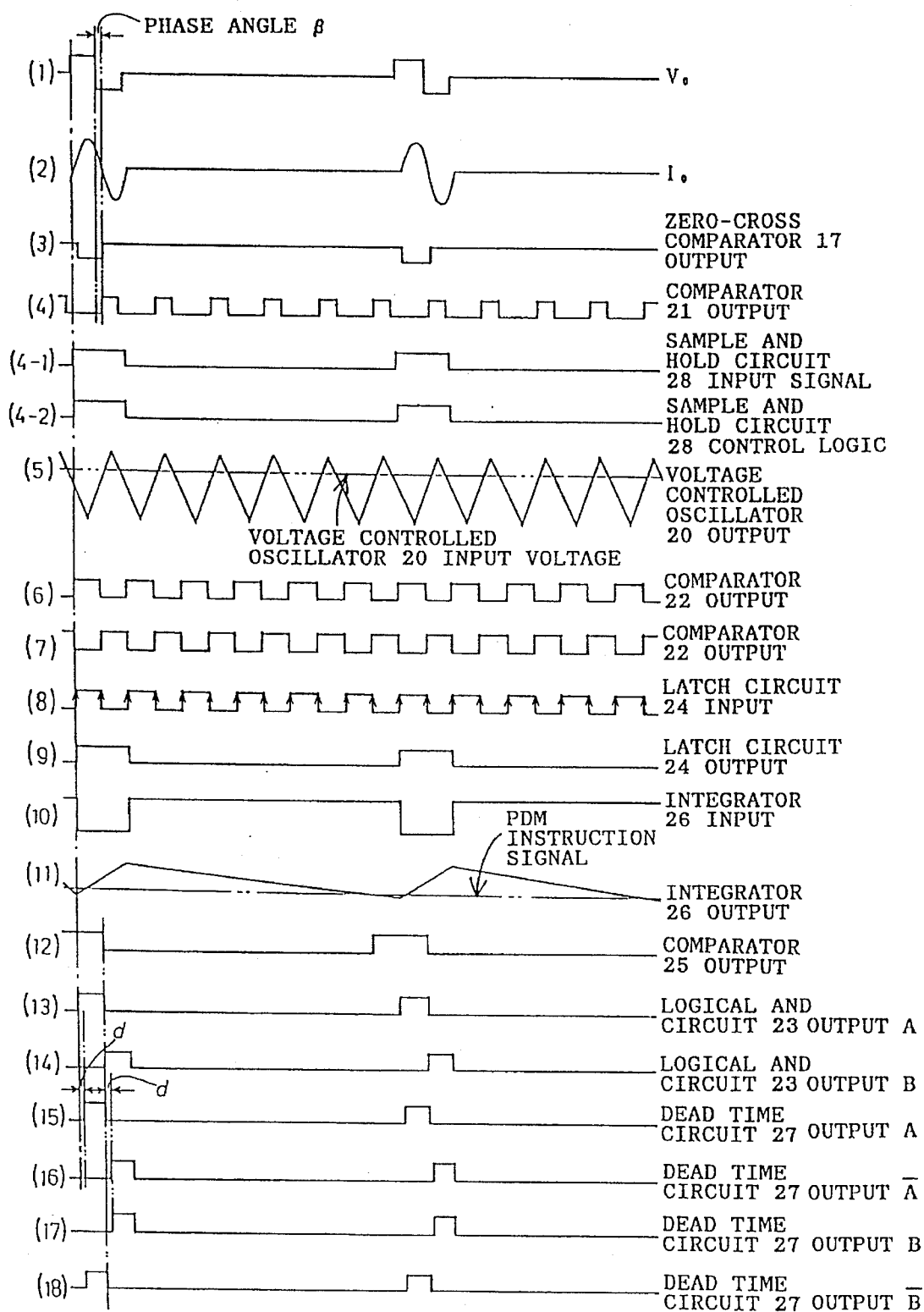
FIG. 12 is a time chart illustrating operation of the controlling apparatus of FIG. 11.
Figure 13:
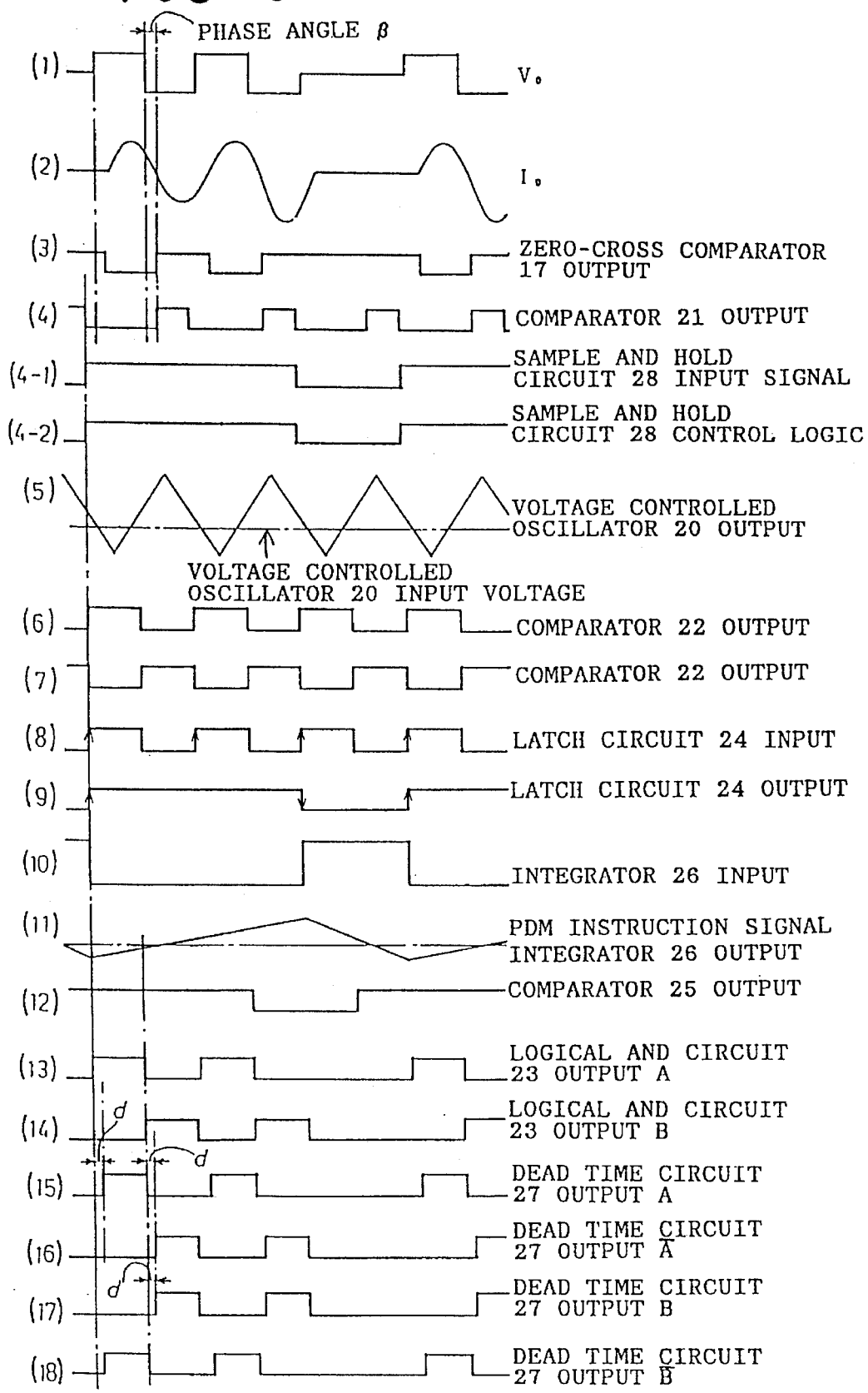
FIG. 13 is a time chart illustrating operation of the controlling apparatus of FIG. 11 in a different thinning out condition.

The present control circuit is different from the control circuit of FIG. 2 in that it additionally includes, in the phase locked loop circuit 15, a sample and hold clrcult 28 interposed between the low-pass filter 19 and the voltage controlled oscillator 20 and serving as voltage storage means such that it is controlled by the output of the latch circuit 24. Operation of the control circuit of FIG. 11 is illustrated in FIG. 12, and different operation of the control circuit is illustrated in FIG. 13. It is to be noted that FIG. 12 illustrates the operation when five pulses are thinned out from each six pulses while FIG. 13 illustrates the operation when one pulse is thinned out for each three pulses.

The sample and hold circuit 28 is constituted from a buffer amplifier, a holding capacitor, a switch and a driver circuit for the same as well known in the art. When the switch is turned on, the sample hold circuit 28 samples the output voltage of the low-pass filter 19 shown by the waveform curve (4–1) of FIG. 12 and holds the voltage. The output of the latch circuit 24 in the pulse density modulation circuit 16 shown by the waveform curve (9) of FIG. 12 is inputted as a switch controlling signal to the sample and hold circuit 28, and each time the output of the waveform curve (9) changes to the high level, the switch of the sample and hold circuit 28 is turned on as seen from the waveform curve (4–2) of FIG. 12 to sample and hold the output voltage of the low-pass filter 19 so that, also after the output shown by the waveform curve (9) changes to the low level, the sample and hold circuit 28 thereafter continues to hold the voltage. In other words, the sample and hold circuit 28 samples and holds the input voltage before the pulse density modulation circuit 16 enters a zero voltage outputting period described above, and inputs the same voltage to the voltage controlled oscillator 28.

Accordingly, the voltage controlled oscillator 28 continuously generates a signal of the same frequency, and consequently, the phase locked loop circuit 15 can be synchronized accurately with the resonance circuit also during a zero voltage outputting period and can thus continue its stabilized operation.

Figure 14:
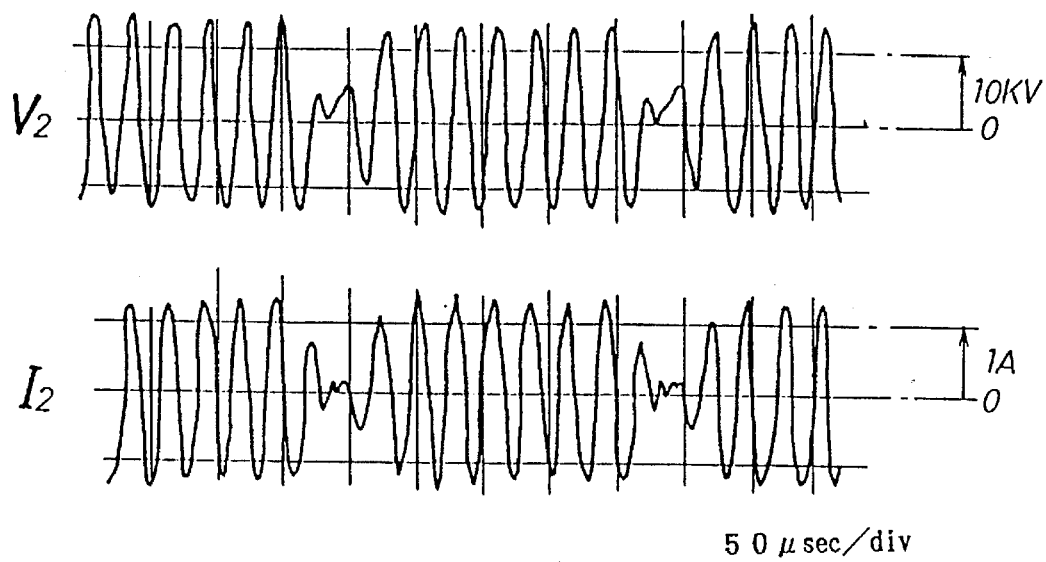
FIG. 14 is a waveform diagram illustrating a voltage and a current of a secondary winding of a high voltage transformer of the controlling apparatus of FIG. 11 according to results of an experiment conducted with an experimental model of the controlling apparatus of FIG. 11.
Figure 15:
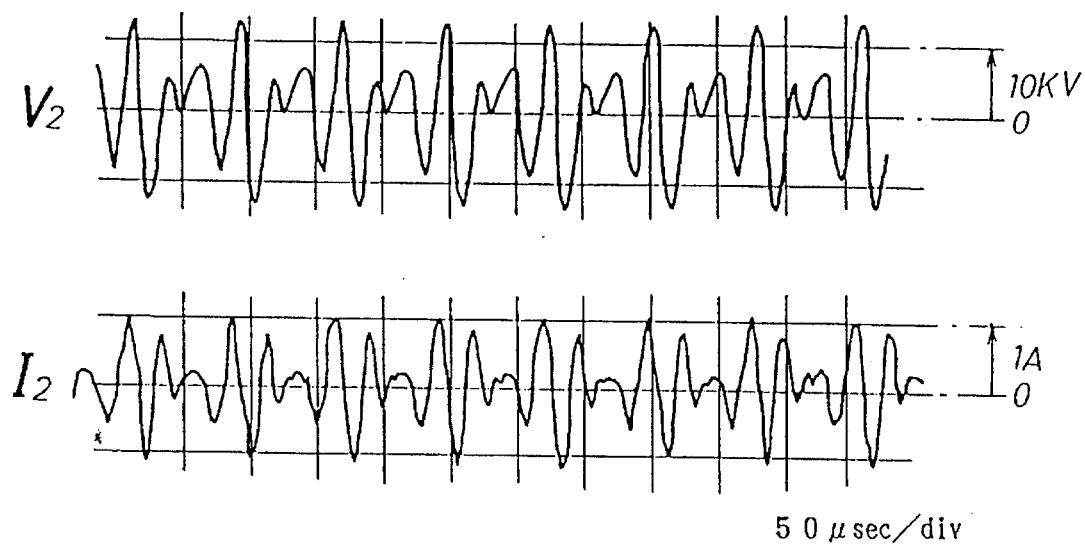
FIG. 15 is a similar view but illustrating the voltage and the current according to results of another experiment conducted in a different condition.

An experimental model of a control circuit was manufactured in accordance with the construction described above, and an experiment was conducted with the experimental model. FIGS. 14 and 15 illustrate results of the experiment. In particular, FIG. 14 shows the voltage waveform and the current waveform on the secondary side of the high voltage transformer 7 when the dc input to the high frequency invertor 6 of FIG. 1 was 200 V in voltage, 9.6 A in current and 1,920 W in power consumption and the pulse ratio by the pulse density modulation circuit 16 of FIG. 11 (and FIG. 2) was 8/9, that is, one pulse was thinned out for each nine pulses. Meanwhile, FIG. 15 shows the voltage waveform and the current waveform on the secondary side of the high voltage transformer 7 when the dc input to the high frequency invertor 6 was 200 V in voltage, 4.5 A in current and 900 W in power consumption and the pulse ratio by the pulse density modulation circuit 16 was 2/3, that is, one pulse was thinned out for each three pulses.

Figure 16:
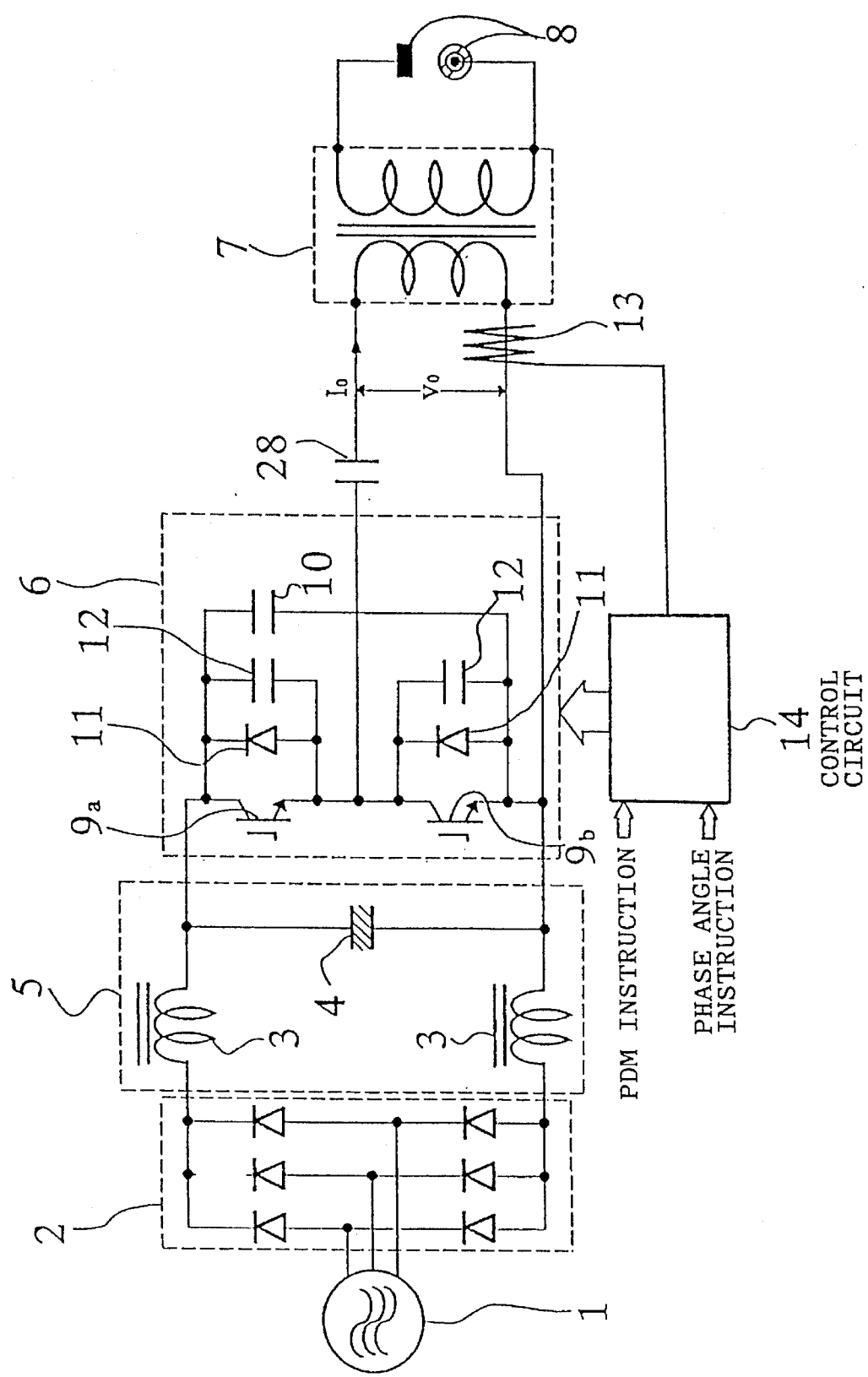
FIG. 16 is an electric circuit diagram of another high frequency high voltage power source wherein a high frequency invertor has a half bridge construction including two insulated gate bipolar transistors.

While, in the high frequency high voltage power source shown in FIG. 1, the high frequency invertor 6 has the full bridge construction including four insulated gate bipolar transistors, it may otherwise have a half bridge construction Including two insulated gate bipolar transistors 9a and 9b and be connected to the high voltage transistor 7 by way of a capacitor 28 as shown in FIG. 16. Where the high frequency invertor 6 is constituted from insulated gate bipolar transistors, it is reliable in high speed operation, but it may be constituted alternatively from field effect transistors (FETs), or where the frequency required is not so high, the high frequency invertor 6 may be constituted from any other popular switching semiconductor elements.

Further, while, in the controlling apparatus shown in FIG. 11, a sample and hold circuit which stores in an analog fashion is employed as the voltage storage means of the phase lock loop clrcult 15 for storing an input voltage before a zero voltage outputting period is entered, it may be replaced by a memory which stores digitally under the control of a computer. Also the pulse density modulation circuit 16 can be constructed from a digital circuit in place of such analog circuit configuration as described above. In this instance, a signal from the phase locked loop circuit 15 is converted into digital data by a counter, and pulses of an arbitrary pattern are read out, in response to data from the counter, from a memory in which various pulse patterns are stored in advance. Then, the pulses thus read out are synchronized with pulses from the phase locked loop circuit to obtain a gate signal for the high frequency converter.

Having now fully described the invention, it will be apparent to one of ordinary skill in the art that many changes and modifications can be made thereto without departing from the spirit and scope of the invention as set forth herein.

What is claimed is:

1. A controlling apparatus for a high frequency high voltage power source for corona discharge processing of the type wherein an ac voltage from a commercial ac power supply is rectified into a dc voltage by a rectifier circuit and then converted into a voltage of a high frequency, comprising:

a high frequency invertor including a plurality of switching semiconductor elements connected in a bridge connection for converting the rectified voltage into a voltage of high frequency, a high voltage transformer, having a discharge electrode for corona discharge processing, for boosting the voltage of high frequency and applying the boosted voltage to said discharge electrode, said high voltage transformer and at least said discharge electrode forming a resonance circuit with respect to said high frequency invertor, said controlling apparatus comprising:

current detection means for detecting a current flowing between said high frequency invertor and said high voltage transformer;

a phase locked loop circuit including a phase comparator and a voltage controlled oscillator for outputting a signal having a phase corresponding to the detection current of said current detection means and a frequency corresponding to a voltage of a signal output by said phase comparator;

a pulse density modulation circuit for inputting an output signal of said phase locked loop and thinning out the inputted output signal in accordance with an arbitrary instruction value to output a pulse signal synchronized with the inputted output signal and having a zero voltage outputting period of an arbitrary time length; and a gate signal generation circuit for inputting the pulse signal from said pulse density modulation circuit and outputting a gate signal to said switching semiconductor elements of said high frequency invertor so that said resonance circuit may be put into and remain in a short-circuited condition within the zero voltage outputting period.

2. A controlling apparatus for a high frequency high voltage power source for corona discharge processing as claimed in claim 1, further comprising voltage storage means for storing an input voltage to said voltage controlled oscillator before the zero voltage outputting period is entered and inputting the thus stored voltage to said voltage controlled oscillator also during the zero voltage outputting period.

3. A controlling apparatus for a high frequency high voltage power source for corona discharge processing as claimed in claim 2, wherein said voltage storage means is a sample and hold circuit.

4. A controlling apparatus for a high frequency high voltage power source for corona discharge processing as claimed in claim 1, wherein each of said switching semiconductor elements is a bipolar transistor of the insulated gate type.

\* \* \* \* \*